US012415255B2

(12) United States Patent
Bajpai

(10) Patent No.: US 12,415,255 B2
(45) Date of Patent: Sep. 16, 2025

(54) SETTING TOOL PARAMETER BASED ON FASTENER CHARACTERISTIC

(71) Applicant: MILWAUKEE ELECTRIC TOOL CORPORATION, Brookfield, WI (US)

(72) Inventor: Dhananjai Bajpai, Evanston, IL (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 23 days.

(21) Appl. No.: 18/514,232

(22) Filed: Nov. 20, 2023

(65) Prior Publication Data

US 2024/0165774 A1 May 23, 2024

Related U.S. Application Data

(60) Provisional application No. 63/384,894, filed on Nov. 23, 2022.

(51) Int. Cl.
*B25B 21/00* (2006.01)
*B25B 21/02* (2006.01)
*B25B 23/147* (2006.01)

(52) U.S. Cl.
CPC ........ *B25B 21/023* (2013.01); *B25B 23/1475* (2013.01)

(58) Field of Classification Search
CPC .......................... B25B 21/023; B25B 23/1475
See application file for complete search history.

(56) References Cited

U.S. PATENT DOCUMENTS

2011/0173819 A1* 7/2011 Koeder ................ B23D 59/002 83/72
2011/0314683 A1* 12/2011 Koeder ................ B23D 59/002 173/217
2015/0122520 A1* 5/2015 Rola ...................... G05B 19/12 173/1
2016/0250738 A1* 9/2016 Leh ..................... B25B 23/1475 173/176
2023/0256580 A1* 8/2023 Yang ....................... B25B 21/02 173/93
2023/0268866 A1* 8/2023 Friedman .................. H02P 3/06 173/93.5

* cited by examiner

*Primary Examiner* — Eyamindae C Jallow
(74) *Attorney, Agent, or Firm* — Michael Best & Friedrich LLP

(57) ABSTRACT

Systems and methods for determining tool parameters based on characteristics of a driven fastener. Power tools described herein include a motor and an impact mechanism coupled to the motor. The impact mechanism includes a hammer driven by the motor and an anvil configured to receive an impact from the hammer and drive a fastener. The power tool includes a controller connected to the motor. The controller is configured to receive a visual indication of the fastener and identify a type of the fastener based on the visual indication. The controller is configured to determine a K-Factor of the fastener based on the type of the fastener, set an operating parameter for driving the motor based on the K-Factor, and drive the motor according to the operating parameter.

20 Claims, 8 Drawing Sheets

SETTING TOOL PARAMETER BASED ON FASTENER CHARACTERISTIC

RELATED APPLICATIONS

This application claims the benefit of U.S. Provisional Patent Application No. 63/384,894, filed Nov. 23, 2022, the entire content of which is hereby incorporated by reference.

FIELD

Embodiments described herein relate to determining tool parameters based on characteristics of a fastener.

SUMMARY

Power tools described herein include a motor and an impact mechanism coupled to the motor. The impact mechanism includes a hammer driven by the motor and an anvil configured to receive an impact from the hammer and drive a fastener. The power tool includes a controller connected to the motor. The controller is configured to receive a visual indication of the fastener and identify a type of the fastener based on the visual indication. The controller is configured to determine a K-Factor of the fastener based on the type of the fastener, set an operating parameter for driving the motor based on the K-Factor, and drive the motor according to the operating parameter.

In some aspects, the visual indication of the fastener includes an image of the fastener.

In some aspects, the visual indication of the fastener includes an image of a packaging for the fastener.

In some aspects, the type of the fastener is determined based on at least one of a size of the fastener, a thread pitch of the fastener, a type of thread of the fastener, a length of the fastener, a material of the fastener, a coating applied to the fastener, a cleanliness of the fastener, a type of lubricant applied to the fastener, a reflectivity of the fastener, or a temperature of the fastener.

In some aspects, to identify the type of the fastener, the controller is configured to apply a machine-learning model to the visual indication of the fastener.

In some aspects, to identify the type of the fastener, the controller is configured to transmit the visual indication to a server, and the server is configured to store the machine-learning model.

In some aspects, the operating parameter is an output torque of the motor.

In some aspects, the power tool includes a camera configured to capture the visual indication of the fastener.

In some aspects, the power tool includes a transceiver configured to communicate with an external device, and the controller is configured to receive the visual indication of the fastener from the external device.

Methods for controlling a power tool motor described herein include receiving a visual indication of a fastener and identifying a type of the fastener based on the visual indication. The fastener is driven by the power tool motor. The method includes determining a K-Factor of the fastener based on the type of the fastener, setting an operating parameter for driving the power tool motor based on the K-Factor, and driving the power tool motor according to the operating parameter.

In some aspects, the visual indication of the fastener includes an image of the fastener.

In some aspects, the visual indication of the fastener includes an image of a packaging for the fastener.

In some aspects, the type of the fastener is determined based on at least one of a size of the fastener, a thread pitch of the fastener, a type of thread of the fastener, a length of the fastener, a material of the fastener, a coating applied to the fastener, a cleanliness of the fastener, a type of lubricant applied to the fastener, a reflectivity of the fastener, or a temperature of the fastener.

In some aspects, identifying the type of the fastener includes implementing a machine-learning model on the visual indication of the fastener.

In some aspects, identifying the type of the fastener includes transmitting the visual indication to a server, and the server stores the machine-learning model.

In some aspects, the operating parameter is an output torque of the power tool motor.

In some aspects, receiving the visual indication of the fastener includes receiving an image of the fastener from a camera embedded within a housing of the power tool.

Power tools described herein include a motor. The power tool includes a controller connected to the motor. The controller is configured to receive a visual indication of a fastener and identify, using a machine-learning model, a characterization of the fastener based on the visual indication. The controller is configured to determine a characteristic of the fastener based on the characterization of the fastener, set an operating parameter for driving the motor based on the characteristic of the fastener, and drive the motor according to the operating parameter.

In some aspects, the power tool includes a camera configured to capture the visual indication of the fastener.

In some aspects, the power tool includes a transceiver configured to communicate with an external device, and the controller is configured to receive the visual indication of the fastener from the external device.

Before any embodiments are explained in detail, it is to be understood that the embodiments are not limited in application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of “including,” “comprising,” or “having” and variations thereof are meant to encompass the items listed thereafter and equivalents thereof as well as additional items. Unless specified or limited otherwise, the terms “mounted,” “connected,” “supported,” and “coupled” and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits (“ASICs”). As such, it should be noted that a plurality of hardware and software based devices, as well as a plurality of different structural components, may be utilized to implement the embodiments. For example, “servers” and “computing devices” described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

Functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
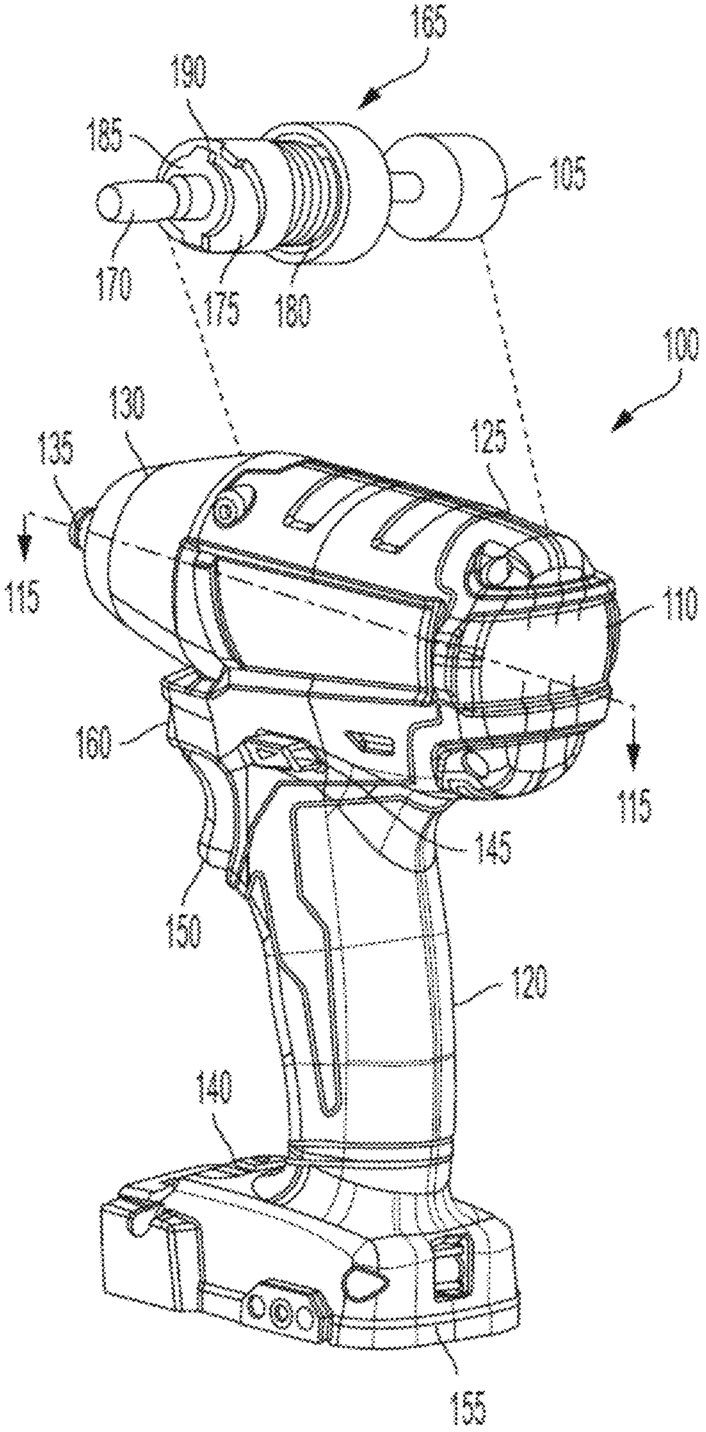
FIG. 1 illustrates a power tool in accordance with embodiments described herein.

FIG. 1 illustrates a power tool 100 including a brushless direct current ("BLDC") motor 105. In a brushless motor power tool, such as power tool 100, switching elements are selectively enabled and disabled by control signals from a controller to selectively apply power from a power source (e.g., a battery pack) to drive (e.g., control) a brushless motor. In some embodiments, the power tool 100 is a brushless impact wrench having a housing 110 with a central axis 115, a handle portion 120, and a motor housing portion 125. The motor housing portion 125 is mechanically coupled to an impact case 130 that houses an output unit 135. The impact case 130 forms a nose of the power tool 100, and can be made from a different material than the housing 110. For example, the impact case 130 may be metal, while the housing 110 may be plastic. The power tool 100 further includes a mode select button 140, forward/reverse selector 145, trigger 150, battery pack interface 155, and light 160. In some embodiments, the power tool 100 further includes a camera (such as camera 315 shown in FIG. 3) embedded within the housing 110. Although the power tool 100 illustrated in FIG. 1 is an impact wrench, the power tool 100 can also be a different type of tool, such as, for example, a hammer drill, an impact hole saw, an impact driver, a drill/driver, and the like.

Figure 2:
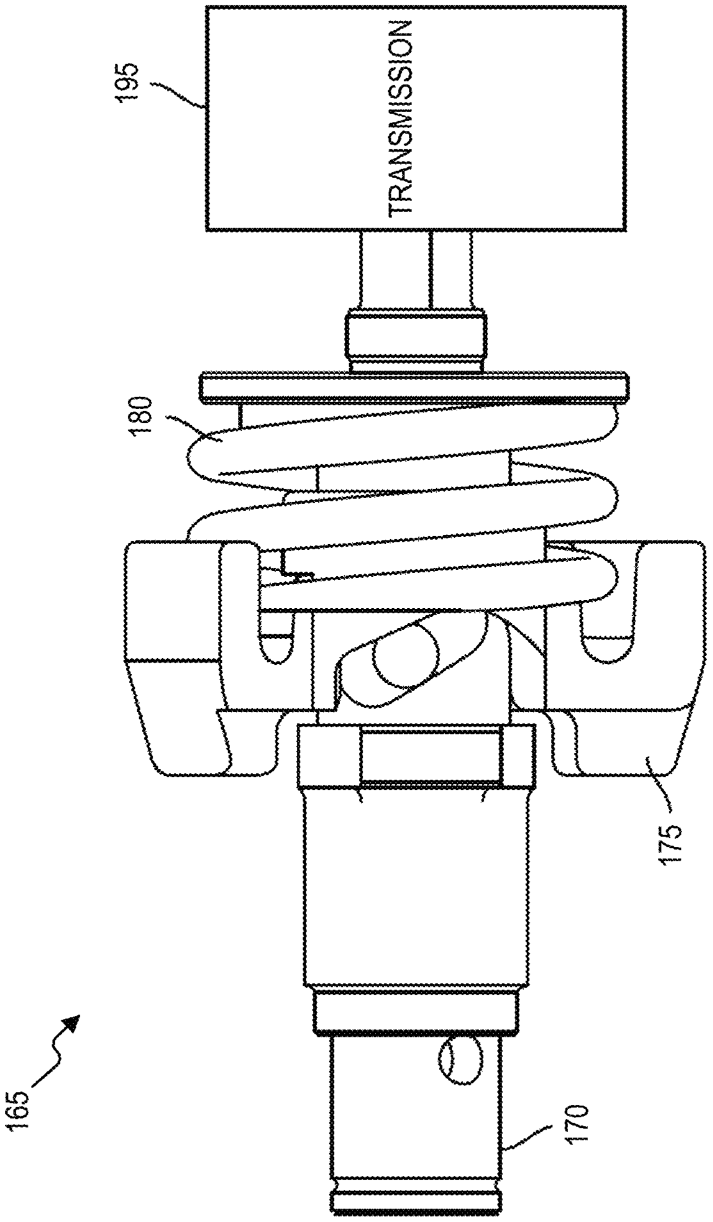
FIG. 2 illustrates a side view of an isolated impact mechanism of the power tool of FIG. 1.

The power tool 100 also includes an impact mechanism 165 including an anvil 170, and a hammer 175. The impact mechanism 165 is positioned within the impact case 130 and is mechanically coupled to the motor 105 via a transmission 195 (see FIG. 2). The transmission 195 may include, for example, gears or other mechanisms to transfer the rotational power from the motor 105 to the impact mechanism 165, and in particular, to the hammer 175. The hammer 175 is axially biased to engage the anvil 170 via a spring 180. The hammer 175 impacts the anvil 170 periodically to increase the amount of torque delivered by the power tool 100 (e.g., the anvil 170 drives the output unit 135). The anvil 170 includes an engagement structure 185 that is rotationally fixed with portions of the anvil 170. The engagement structure 185 includes a plurality of protrusions 190 (e.g., two protrusions in the illustrated embodiment) to engage the hammer 175 and receive the impact from the hammer 175. During an impacting event or cycle, as the motor 105 continues to rotate, the power tool 100 encounters a higher resistance and winds up the spring 180 coupled to the hammer 175. As the spring 180 compresses, the spring 180 retracts toward the motor 105, pulling along the hammer 175 until the hammer 175 disengages from the anvil 170 and surges forward to strike and re-engage the anvil 170. An impact refers to the event in which the spring 180 releases and the hammer 175 strikes the anvil 170. The impacts increase the amount of torque delivered by the anvil 170. In some instances, the output unit 135 is configured to receive a fastener, such as a bolt. Accordingly, the anvil 170 drives the fastener into a workpiece when the hammer 175 strikes the anvil 170.

Figure 3:
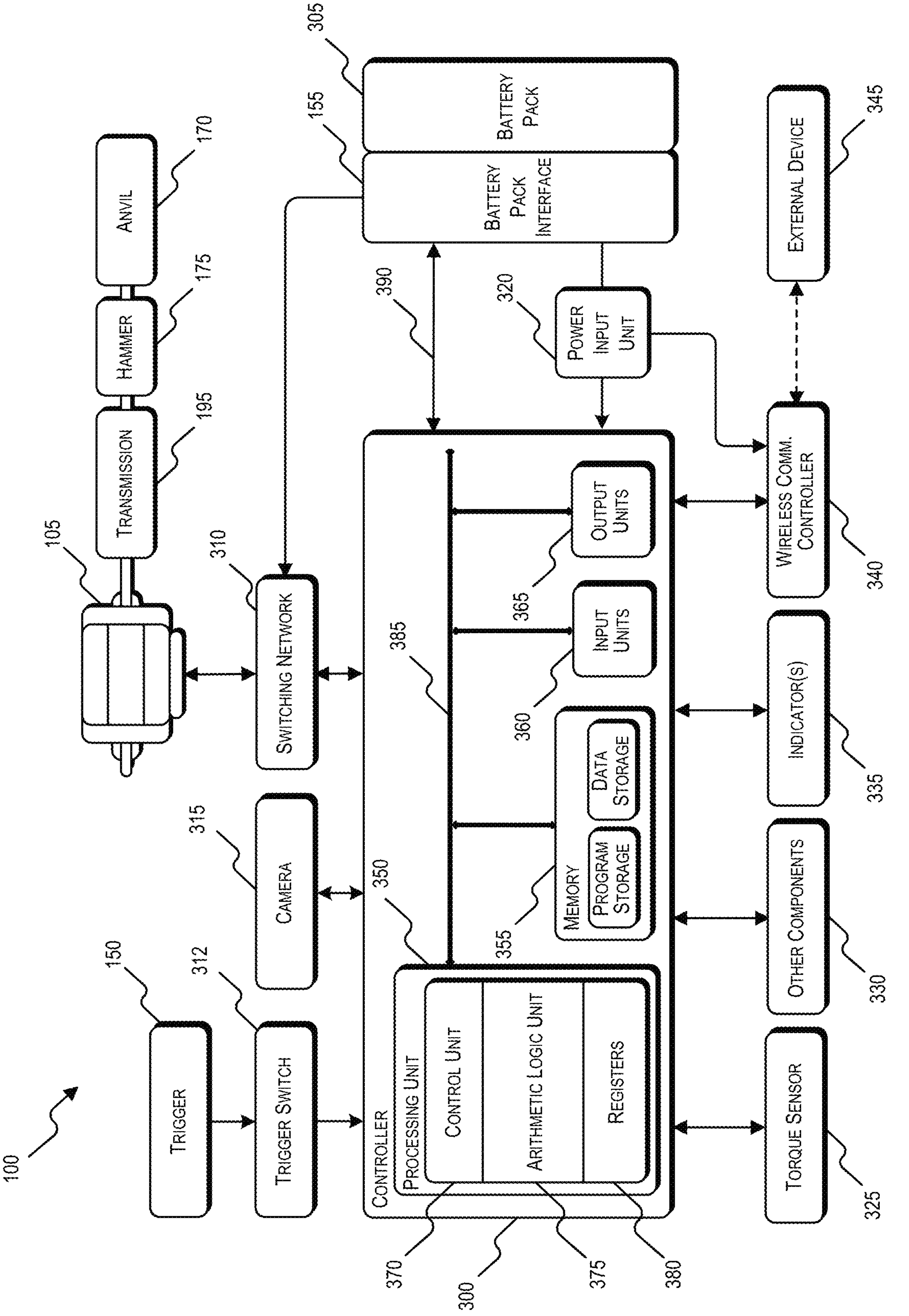
FIG. 3 illustrates a block diagram of a controller for the power tool of FIG. 1 in accordance with embodiments described herein.

FIG. 3 illustrates an electromechanical diagram of the brushless power tool 100, which includes a controller 300. The controller 300 is electrically and/or communicatively connected to a variety of modules or components of the power tool 100. For example, the illustrated controller 300 is connected to a battery pack 305, a switching network 310, the trigger 150 (via a trigger switch 312), a camera 315 (e.g., a visual light camera, an infrared camera, etc.), a power input unit 320, a torque sensor 325, other components 330 (e.g., a battery pack fuel gauge, work lights [e.g., LEDs], current/voltage sensors, etc.), one or more indicators 335 (e.g., LEDs), and communication controller 340 (e.g., a transceiver or a wired interface) configured to communicate with an external device 345 (e.g., a smartphone, a tablet computer, a laptop computer, and the like). In some embodiments, the external device 345 includes the camera 315.

The controller 300 includes combinations of hardware and software that are operable to, among other things, control the operation of the power tool 100, detect linear and/or rotational positions associated with the impact mechanism 165, control power provided to the motor 105, etc. In some embodiments, the controller 300 includes a plurality of electrical and electronic components that provide power, operational control, and protection to the components and modules within the controller 300 and/or power tool 100. For example, the controller 300 includes, among other things, a processing unit 350 (e.g., a microprocessor, a microcontroller, an electronic controller, an electronic processor, or another suitable programmable device), a memory 355, input units 360, and output units 365. The processing unit 350 includes, among other things, a control unit 370, an arithmetic logic unit ("ALU") 375, and a plurality of registers 380 (shown as a group of registers in FIG. 3), and is implemented using a known computer architecture (e.g., a modified Harvard architecture, a von Neumann architecture, etc.). The processing unit 350, the memory 355, the input units 360, and the output units 365, as well as the various modules connected to the controller 300 are connected by one or more control and/or data buses (e.g., common bus 385). The control and/or data buses are shown generally in FIG. 3 for illustrative purposes. The use of one or more control and/or data buses for the interconnection between and communication among the various modules and components would be known to a person skilled in the art in view of the embodiments described herein.

The memory 355 is a non-transitory computer readable medium that includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 350 is connected to the memory 355 and executes software instructions that are capable of being stored in a RAM of the memory 355 (e.g., during execution), a ROM of the memory 355 (e.g., on a generally permanent basis), or another non-transitory computer readable medium such as another memory or a disc. Software included in the implementation of the power tool 100 can be stored in the memory 355 of the controller 300. The software includes, for example, firmware, one or more applications, program data, filters, rules, one or more program modules, and other executable instructions. The controller 300 is configured to retrieve from memory and execute, among other things, instructions related to the control of the power tool 100 described herein. In other constructions, the controller 300 includes additional, fewer, or different components.

In some embodiments, as described above, the power tool 100 is an impact wrench. The controller 300 drives the motor 105 to pull the hammer 175 in response to a user's actuation of the trigger 150. Depression of the trigger 150 actuates a trigger switch 312, which outputs a signal to the controller 300 to drive the motor 105. The controller 300 controls a switching network 310 (e.g., a FET switching bridge) to drive the motor 105. When the trigger 150 is released, the trigger switch 312 no longer outputs a signal to the controller 300 (or outputs a released signal to the controller 300). The controller 300 may cease driving the motor 105 when the trigger 150 is released, or may brake the motor 105.

The battery pack interface 155 is connected to the controller 300 and couples the power tool 100 to a battery pack 305. The battery pack interface 155 includes a combination of mechanical (e.g., a battery pack receiving portion) and electrical components configured to and operable for interfacing (e.g., mechanically, electrically, and communicatively connecting) the power tool 100 with the battery pack 305. The battery pack interface 155 is coupled to the power input unit 320. The battery pack interface 155 transmits the power received from the battery pack 305 to the power input unit 320. The power input unit 320 includes active and/or passive components (e.g., voltage step-down controllers, voltage converters, rectifiers, filters, etc.) to regulate or control the power received through the battery pack interface 155 and to the wireless communication controller 340 and the controller 300.

The indicators 335 are also connected to the controller 300 and receive control signals from the controller 300 to turn on and off or otherwise convey information based on different states of the power tool 100. The indicators 335 include, for example, one or more light-emitting diodes (LEDs) or a display screen. The indicators 335 can be configured to display conditions of, or information associated with, the power tool 100. For example, the indicators 335 can display information relating to an operational state of the power tool 100, such as a mode or setting. In some embodiments, the indicators 335 display information relating to a type of fastener detected by the power tool 100, or operating parameters set by the controller 300 for driving the motor 105. The indicators 335 may display information relating to a fault condition or other abnormality of the power tool 100. In addition to or in place of visual indicators, the indicators 335 may also include a speaker or a tactile feedback mechanism to convey information to a user through audible or tactile outputs.

In some embodiments, a camera 315 is connected to the controller 300. The controller 300 may command the camera 315 to capture images and/or video of objects within the field of view of the camera 315. For example, in some instances, a fastener or similar object is held within the field of view of the camera 315. The controller 300 commands the camera 315 to capture an image with the camera 315. The camera 315 provides the image to the controller 300. In some embodiments, the camera 315 captures an image of a fastener or packaging associated with the fastener.

In some embodiments, the power tool 100 includes a torque sensor 325 for sensing a torque output of the motor 105 or power tool 100. The torque sensor may include or be used in conjunction with, for example, an anvil rotation sensor configured to sense rotation of the anvil 170, a hammer translation sensor configured to sense movement of the hammer 175, or a combination thereof. Other types of torque sensors may also be implemented. During operation of the motor 105, the torque sensor 325 monitors the torque provided by the motor 105 and transmits a torque signal indicative of the torque to the controller 300. The controller 300 may use the torque signal as feedback while driving the motor 105. For example, the controller 300 refers to the torque signal to ensure that the motor 105 is providing a desired amount of torque for a given fastener.

In some embodiments, controller 300 also controls other aspects of the power tool 100 such as, for example, operation of other components 330 (such as a work light and/or a fuel gauge), recording of usage data, communication with an external device, and the like. In some embodiments, the controller 300 is configured to control the operation of the motor 105 based on the number of impacts executed by the hammer 175 of the power tool 100. For example, in some embodiments, the other components 330 includes a plurality of sensors, such as voltage sensors, current sensors, speed sensors, temperature sensors, Hall sensors, and the like. The controller 300 is configured to monitor a change in position, speed, and/or acceleration associated with the impact mechanism 165 to detect the number of impacts executed by the power tool 100. The controller 300 can then control the motor 105 based on the detected number of impacts. By monitoring the impact mechanism 165 directly, the controller 300 can effectively control, for example, the number of impacts over the entire range of the tool's battery charge and motor speeds (i.e., regardless of the battery charge or the motor speed).

Figure 4:
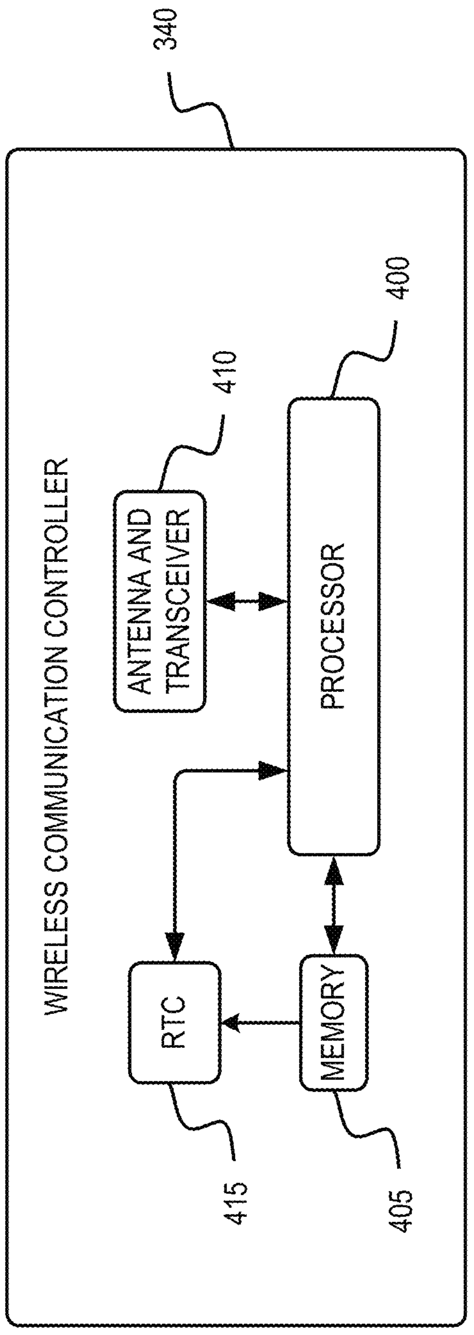
FIG. 4 illustrates a block diagram of a wireless communication controller in accordance with embodiments described herein.

As shown in FIG. 4, the wireless communication controller 340 includes a processor 400, a memory 405, an antenna and transceiver 410, and a real-time clock (RTC) 415. The wireless communication controller 340 enables the power tool 100 to communicate with an external device 345 (sec, e.g., FIG. 5). The radio antenna and transceiver 410 operate together to send and receive wireless messages to and from the external device 345 and the processor 400. The memory 405 can store instructions to be implemented by the processor 400 and/or may store data related to communications between the power tool 100 and the external device 345 or the like. The processor 400 for the wireless communication controller 340 controls wireless communications between the power tool 100 and the external device 345. For example, the processor 400 associated with the wireless communication controller 340 buffers incoming and/or outgoing data, communicates with the controller 300, and determines the communication protocol and/or settings to use in wireless communications. The communication via the wireless communication controller 340 can be encrypted to protect the data exchanged between the power tool 100 and the external device 345 from third parties.

In the illustrated embodiment, the wireless communication controller 340 is a Bluetooth® controller. The Bluetooth® controller communicates with the external device 345 employing the Bluetooth® protocol. Therefore, in the illustrated embodiment, the external device 345 and the power tool 100 are within a communication range (i.e., in proximity) of each other while they exchange data. In other embodiments, the wireless communication controller 340 communicates using other protocols (e.g., Wi-Fi, ZigBee, a proprietary protocol, etc.) over different types of wireless networks. For example, the wireless communication controller 340 may be configured to communicate via Wi-Fi through a wide area network such as the Internet or a local area network, or to communicate through a piconet (e.g., using infrared or NFC communications).

In some embodiments, the network is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, 5G New Radio, a Digital Enhanced Cordless Telecommunications ("DECT") network, a Digital AMPS ("IS-136/TDMA") network, or an Integrated Digital Enhanced Network ("iDEN") network, etc.

The wireless communication controller 340 is configured to receive data from the controller 300 and relay the information to the external device 345 via the antenna and transceiver 410. In a similar manner, the wireless communication controller 340 is configured to receive information (e.g., configuration and programming information) from the external device 345 via the antenna and transceiver 410 and relay the information to the controller 300.

The RTC 415 can increment and keep time independently of the other power tool 100 components. The RTC 415 can receive power from the battery pack 305 when the battery pack 305 is connected to the power tool 100. In some embodiments, the RTC 415 can receive power from a back-up power source (e.g., a coin cell battery) when the battery pack 305 is not connected to the power tool 100. Having the RTC 415 as an independently powered clock enables time stamping of operational data (stored in memory 405 for later export) and a security feature whereby a lockout time is set by a user (e.g., via the external device 345) and the tool is locked-out when the time of the RTC 415 exceeds the set lockout time.

Figure 5:
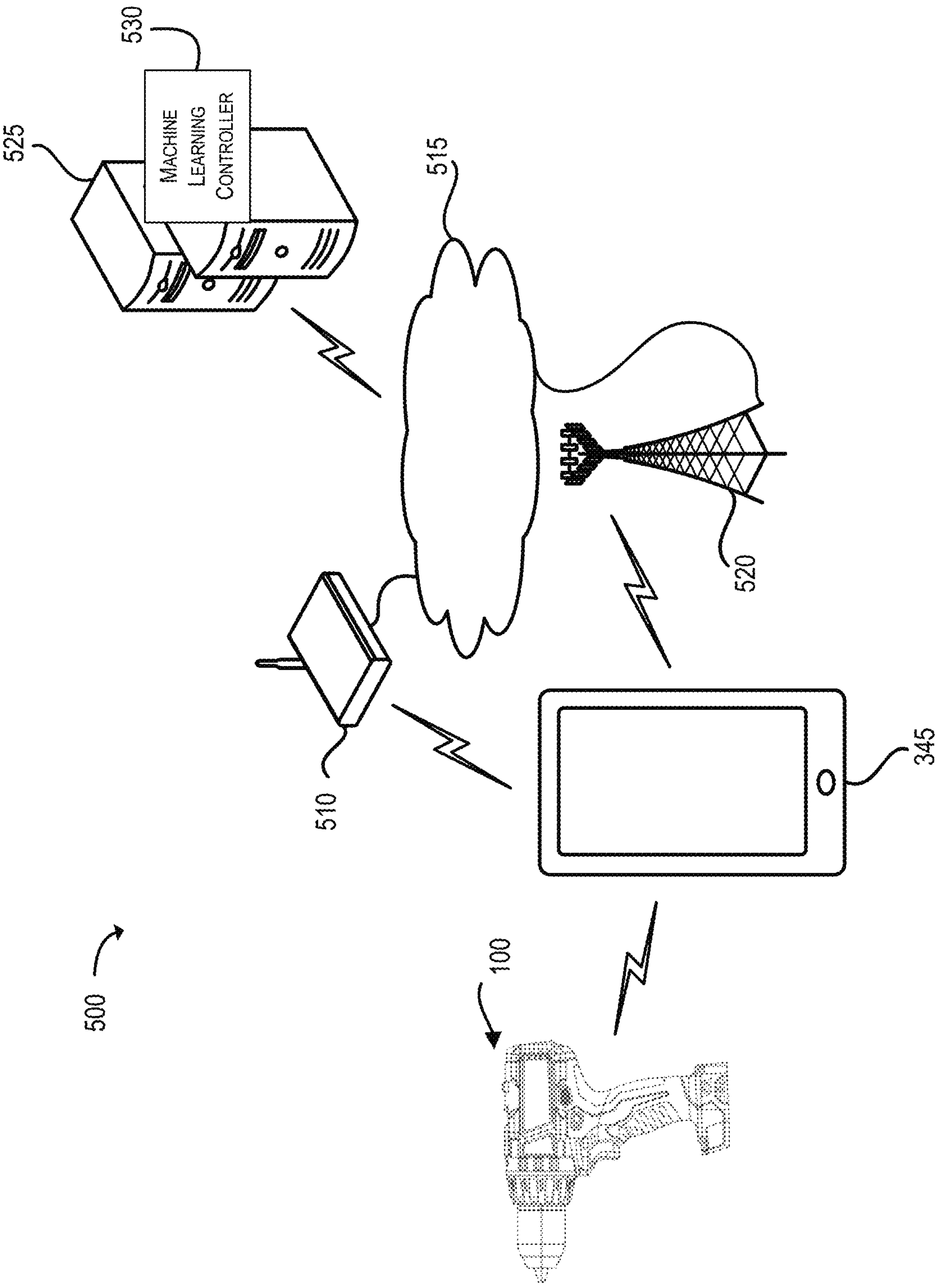
FIG. 5 illustrates a communication system for the power tool of FIG. 1 and an external device in accordance with embodiments described herein.

FIG. 5 illustrates a communication system 500. The communication system 500 includes at least one power tool 100 (illustrated as an impact driver) and the external device 345. Each power tool device 100 (e.g., a battery powered impact driver, a power tool battery pack, and the like) and the external device 345 can communicate wirelessly while they are within a communication range of each other. Each power tool 100 may communicate power tool status, power tool operation statistics, power tool identification, power tool sensor data, stored power tool usage information, power tool maintenance data, and the like.

More specifically, the power tool 100 can monitor, log, and/or communicate various tool parameters that can be used for confirmation of correct tool performance, detection of a malfunctioning tool, determination of a need or desire for service, etc. Taking, for example, the impact wrench as the power tool 100, the various tool parameters detected, determined, and/or captured by the controller 300 and output to the external device 345 can include a total operating time, a type of fastener received by the power tool 100, a total number of fasteners previously driven by the power tool 100, a time (e.g., a number of seconds) that the power tool 100 is on, a number of cycles performed by the tool since a reset and/or since a last data export, a number of remaining service cycles (e.g., a number of cycles before the power tool 100 should be serviced, recalibrated, repaired, or replaced), a number of transmissions sent to the external device 345, a number of transmissions received from the external device 345, a number of errors generated in the transmissions sent to the external device 345, a number of errors generated in the transmissions received from the external device 345, a code violation resulting in a master control unit (MCU) reset, a short in the power circuitry (e.g., a metal-oxide-semiconductor field-effect transistor [MOSFET] short), a hot thermal overload condition (i.e., a prolonged electric current exceeding a full-loaded threshold that can lead to excessive heating and deterioration of the winding insulation until an electrical fault occurs), a cold thermal overload (i.e., a cyclic or in-rush electric current exceeding a zero load threshold that can also lead to excessive heating and deterioration of the winding insulation until an electrical fault occurs), a motor stall condition (e.g., a locked or non-moving rotor with an electrical current flowing through the windings), a fault Hall effect sensor, a non-maskable interrupt (NMI) hardware MCU Reset (e.g., of the controller 300), an over-discharge condition of the battery pack 305, an overcurrent condition of the battery pack 305, a battery dead condition at trigger pull, a tool FETing condition, gate drive refresh enabled indication, thermal and stall overload condition, a malfunctioning torque sensor condition for the torque sensor 325, trigger pulled at tool sleep condition, a Hall effect sensor error occurrence condition for one of the Hall effect sensors, heat sink temperature histogram data, MOSFET junction temperature histogram data, peak current histogram data (from the current sensor), average current histogram data (from the current sensor), the number of Hall effect errors indication, raw sensor values, encoded sensor values (for example, from an RNN encoder), compressed sensor values, operating parameters of the power tool 100, etc.

Using the external device 345, a user can access the tool parameters obtained by the power tool 100. With the tool parameters (e.g., tool operational data), a user can determine how the power tool 100 has been used (e.g., types of fasteners driven by the power tool 100), whether maintenance is recommended or has been performed in the past, and identify malfunctioning components or other reasons for certain performance issues. The external device 345 can also transmit data to the power tool 100 for power tool configuration, firmware updates, or to send commands. The external device 345 also allows a user to set operational parameters, safety parameters, select tool modes, and the like, for the power tool 100.

The external device 345 is, for example, a smart phone (as illustrated), a laptop computer, a tablet computer, a personal digital assistant (PDA), or another electronic device capable of communicating wirelessly with the power tool 100 and providing a user interface. The external device 345 provides the user interface and allows a user to access and interact with the power tool 100. The external device 345 can receive user inputs to determine operational parameters, enable or disable features, and the like. The user interface of the external device 345 provides an easy-to-use interface for the user to control and customize operation of the power tool 100. The external device 345, therefore, grants the user access to the tool operational data of the power tool 100, and provides a user interface such that the user can interact with the controller 300 of the power tool 100.

In addition, as shown in FIG. 5, the external device 345 can also share the tool operational data obtained from the power tool 100 with a remote server 525 connected through a network 515. The remote server 525 may be used to store the tool operational data obtained from the external device 345, provide additional functionality and services to the user, or a combination thereof. In some embodiments, storing the information on the remote server 525 allows a user to access the information from a plurality of different locations. In some embodiments, the remote server 525 collects information from various users regarding their power tool devices and provides statistics or statistical measures to the user based on information obtained from the different power tools. For example, the remote server 525 may provide statistics regarding the experienced efficiency of the power tool 100, typical usage of the power tool 100, and other relevant characteristics and/or measures of the power tool 100. The network 515 may include various networking elements (routers 510, hubs, switches, cellular towers 520, wired connections, wireless connections, etc.) for connecting to, for example, the Internet, a cellular data network, a local network, or a combination thereof as previously described. In some embodiments, the power tool 100 is configured to communicate directly with the server 525 through an additional wireless interface or with the same wireless interface that the power tool 100 uses to communicate with the external device 345.

In some embodiments, the remote server 525 includes a machine learning controller 530. The machine learning controller 530 implements a machine learning program. For example, the machine learning controller 530 is configured to construct a model (e.g., building one or more algorithms) based on example inputs. Supervised learning involves presenting a computer program with example inputs and their actual outputs (e.g., categorizations). The machine learning controller 530 is configured to learn a general rule or model that maps the inputs to the outputs based on the provided example input-output pairs. The machine learning algorithm may be configured to perform machine learning using various types of methods. For example, the machine learning controller 530 may implement the machine learning program using decision tree learning (such as random decision forests), associates rule learning, artificial neural networks, recurrent artificial neural networks, long short term memory neural networks, inductive logic programming, support vector machines, clustering, Bayesian networks, reinforcement learning, representation learning, similarity and metric learning, sparse dictionary learning, genetic algorithms, k-nearest neighbor (KNN), among others, such as those listed in Table 1 below. In some embodiments, the machine learning program is implemented by the controller 300, the external device 345, or a combination of the controller 300, the external device 345, and/or the machine learning controller 530. In some embodiments, the machine learning controller 530 is included in the power tool 100 and/or the external device 345.

TABLE 1

| | |
|---|---|
| Recurrent Models | Recurrent Neural Networks ["RNNs"], Long Short-Term Memory ["LSTM"] models, Gated Recurrent Unit ["GRU"] models, Markov Processes, Reinforcement learning |
| Non-Recurrent Models | Deep Neural Network ["DNN"], Convolutional Neural Network ["CNN"], Converging Neural Network, Support Vector Machines ["SVM"], Anomaly detection (ex: Principle Component Analysis ["PCA"]), logistic regression, decision trees/forests, ensemble methods (combining models), polynomial/Bayesian/ other regressions, Stochastic Gradient Descent ["SGD"], Linear Discriminant Analysis ["LDA"], Quadratic Discriminant Analysis ["QDA"], Nearest neighbors classifications/ regression, naïve Bayes, etc. |

The machine learning controller 530 is programmed and trained to perform a particular task. For example, in some embodiments, the machine learning controller 530 is trained to identify a type of fastener within an image provided to the machine learning controller 530. For example, the machine learning controller 530 may identify characteristics of the fastener, such as a size of the fastener, threads per inch of the fastener, a thread pitch of the fastener, a type of thread of the fastener, a length of the fastener, a material of the fastener (e.g., brass, aluminum, steel, stainless steel, etc.), a coating or coating type applied to the fastener, a cleanliness of the fastener, a type or presence of lubricant applied to the fastener or thread locker, a reflectivity of the fastener, a temperature of the fastener, etc. The training examples used to train the machine learning controller 530 may be graphs or tables of different characteristic values corresponding to a type of the fastener. The training examples may be previously collected training examples, from, for example, a plurality of the same type of power tools. For example, the training examples may have been previously collected from a plurality of power tools of the same type (e.g., impact wrenches) over a span of, for example, one year.

A plurality of different training examples can be provided to the machine learning controller 530. The machine learning controller 530 uses these training examples to generate a model (e.g., a rule, a set of equations, and the like) that helps categorize or estimate the output based on new input data. The machine learning controller 530 may weight different training examples differently to, for example, prioritize different conditions or inputs and outputs to and from the machine learning controller 530. For example, certain observed operating characteristics may be weighed more heavily than others, such as the size of the fastener being weighed more than the cleanliness of the fastener.

In one example, the machine learning controller 530 implements an artificial neural network. The artificial neural network includes an input layer, a plurality of hidden layers or nodes, and an output layer. Typically, the input layer includes as many nodes as inputs provided to the machine learning controller 530. As described above, the number (and the type) of inputs provided to the machine learning controller 530 may vary based on the particular task for the machine learning controller 530. Accordingly, the input layer of the artificial neural network of the machine learning controller 530 may have a different number of nodes based on the particular task for the machine learning controller 530. The input layer connects to the hidden layers. The number of hidden layers varies and may depend on the particular task for the machine learning controller 530. Additionally, each hidden layer may have a different number of nodes and may be connected to the next layer differently. For example, each node of the input layer may be connected to each node of the first hidden layer. The connection between each node of the input layer and each node of the first hidden layer may be assigned a weight parameter. Additionally, each node of the neural network may also be assigned a bias value. However, each node of the first hidden layer may not be connected to each node of the second hidden layer. That is, there may be some nodes of the first hidden layer that are not connected to all of the nodes of the second hidden layer. The connections between the nodes of the first hidden layers and the second hidden layers are each assigned different weight parameters. Each node of the hidden layer is associated with an activation function. The activation function defines how the hidden layer is to process the input received from the input layer or from a previous input layer. These activation functions may vary and be based on not only the type of task associated with the machine learning controller 530, but may also vary based on the specific type of hidden layer implemented.

Each hidden layer may perform a different function. For example, some hidden layers can be convolutional hidden layers which can, in some instances, reduce the dimensionality of the inputs, while other hidden layers can perform statistical functions such as max pooling, which may reduce a group of inputs to the maximum value, an averaging layer, among others. In some of the hidden layers (also referred to as "dense layers"), each node is connected to each node of the next hidden layer. Some neural networks including more than, for example, three hidden layers may be considered deep neural networks. The last hidden layer is connected to the output layer. Similar to the input layer, the output layer typically has the same number of nodes as the possible outputs.

During training, the artificial neural network receives the inputs for a training example and generates an output using the bias for each node, and the connections between each node and the corresponding weights. The artificial neural network then compares the generated output with the actual output of the training example. Based on the generated output and the actual output of the training example, the neural network changes the weights associated with each node connection. In some embodiments, the neural network also changes the weights associated with each node during training. The training continues until a training condition is met. The training condition may correspond to, for example, a predetermined number of training examples being used, a minimum accuracy threshold being reached during training and validation, a predetermined number of validation iterations being completed, and the like. Different types of training algorithms can be used to adjust the bias values and the weights of the node connection based on the training examples. The training algorithms may include, for example, gradient descent, newton's method, conjugate gradient, quasi newton, and levenberg marquardt, among others.

In another example, the machine learning controller 530 implements a support vector machine to perform classification. The machine learning controller 530 may receive inputs from the camera 315. In some embodiments, the machine learning controller 530 analyzes previously-determined characteristics of a fastener. The machine learning controller 530 then defines a margin using combinations of some of the input variables as support vectors to maximize the margin. In some embodiments, the machine learning controller 530 defines a margin using combinations of more than one of similar input variables. The margin corresponds to the distance between the two closest vectors that are classified differently. For example, the margin corresponds to the distance between a vector representing a #8 bolt and a vector representing a #10 bolt. In some embodiments, the machine learning controller 530 uses more than one support vector machine to perform a single classification. For example, when the machine learning controller 530 determines the power tool 100 is driving a #8 bolt, a first support vector machine determines the fastener is a #8 bolt based on the size of the fastener and the reflectivity of the fastener, while a second support vector machine determines the fastener is a #8 bolt based on the length of the fastener and the material of the fastener. The machine learning controller 530 may then determine whether the fastener is a #8 bolt when both support vector machines classify the fastener as a #8 bolt. In other embodiments, a single support vector machine can use more than two input variables and define a hyperplane that separates the types of fasteners.

The training examples for a support vector machine include an input vector including values for the input variables (e.g., the size of the fastener, the length of the fastener, the material of the fastener, and the like), and an output classification indicating the type or property of the fastener. During training, the support vector machine selects the support vectors (e.g., a subset of the input vectors) that maximize the margin. In some embodiments, the support vector machine may be able to define a line or hyperplane that accurately separates the types of fasteners. In other embodiments (e.g., in a non-separable case), however, the support vector machine may define a line or hyperplane that maximizes the margin and minimizes the slack variables, which measure the error in a classification of a support vector machine. After the support vector machine has been trained, new input data can be compared to the line or hyperplane to determine how to classify the new input data. In other embodiments, as mentioned above, the machine learning controller 530 can implement different machine learning algorithms to make an estimation or classification based on a set of input data. For example, a random forest classifier may be used, in which multiple decision trees are implemented to observe different characteristics of the fasteners. Each decision tree has its own output, and majority voting may be used to determine the final output of the machine learning controller 530.

Figure 6:
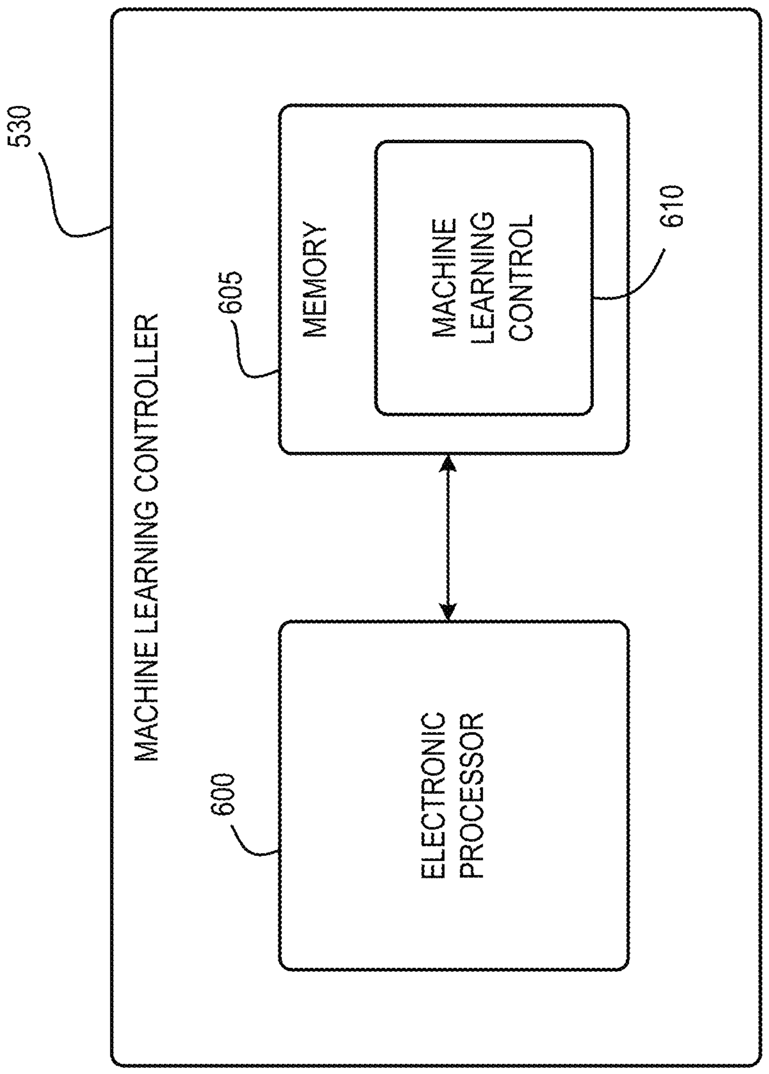
FIG. 6 illustrates a block diagram of a machine learning controller in accordance with embodiments described herein.

As shown in FIG. 6, the machine learning controller 530 includes a machine learning electronic processor 600 and a machine learning memory 605. The machine learning memory 605 stores a machine learning control 610 (e.g., including one or more machine-learning models). The machine learning control 610 may include a trained machine learning program as described above with respect to FIG. 5. In some embodiments, the trained machine learning program is instead stored in the memory 355 of the power tool 100 and implemented by the processing unit 350. As discussed above with respect to FIG. 5, the machine learning control 610 may be built and operated by the remote server 525. In other embodiments, the machine learning control 610 may be built by the remote server 525, but implemented by the power tool 100. In yet other embodiments, the power tool 100 (e.g., the controller 300) builds and implements the machine learning control 610. In yet other embodiments, the machine learning control 610 is built on and/or implemented by an intermediate device, such as a phone, tablet (e.g., the external device 345), gateway, hub, or other power tool separate from the power tool 100.

In embodiments where the machine learning program is implemented by the controller 300 (e.g., locally on the power tool 100), the machine learning control 610 may require firmware or memory updates. Accordingly, a prompt asking a user to update the machine learning program may be provided via the indicators 335 or on a display of the external device 345. Additionally, a user may provide feedback to the machine learning program via the external device 345, such as confirming identified types or properties of fasteners.

In some instances, the type of the fastener and/or characteristics or properties of the fastener are used by the machine learning controller 530, the controller 300, and/or the external device 345 to identify a characteristic (e.g., a K-Factor or nut factor) of the fastener. The K-Factor is a value indicative of an angular resistance of the fastener. For example, a bolt covered in lubricant will have a different K-Factor value than the same bolt without lubrication. As another example, a zinc-plated bolt will have a different K-Factor value than an un-plated bolt. As yet another example, a dirty fastener will have a different K-Factor value than a clean fastener. As the angular resistance of the fastener impacts how much torque is applied to the fastener, the controller 300 may determine the K-Factor to determine an amount of torque to apply to the fastener. For example, once the K-Factor is known, a target torque value can be calculated by multiplying the K-Factor by a nominal diameter of the fastener and a target preload.

Figure 7:
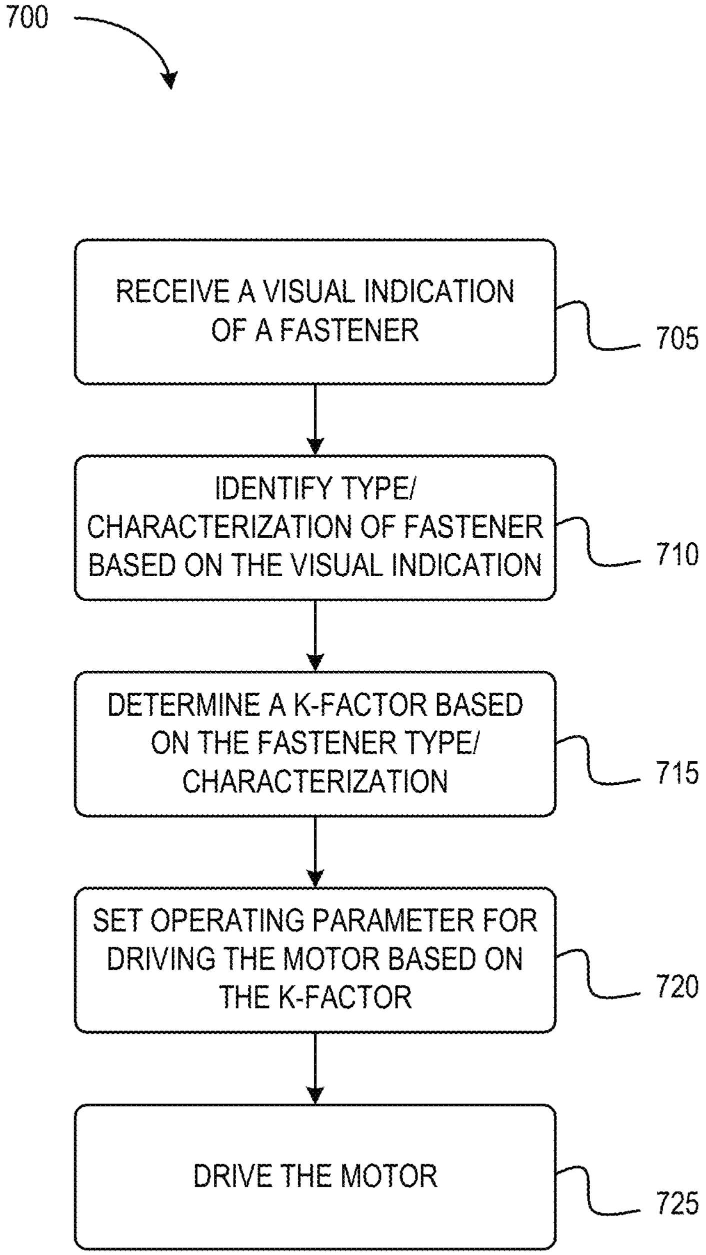
FIG. 7 is a block diagram of a method performed by the controller of FIG. 3 in accordance with embodiments described herein.

FIG. 7 provides a method 700 performed by the controller 300, the external device 345, and/or the machine learning controller 530 for controlling a motor based on the K-Factor of a fastener. At block 705, the controller 300, the external device 345, and/or the machine learning controller 530 receive a visual indication of a fastener. For example, the camera 315 provides the controller 300, the external device 345, and/or the machine learning controller 530 with an image of a fastener. In some instances, the camera 315 provides an image of a packaging associated with a fastener (e.g., a box including size, manufacturer, SKU, etc.). In other embodiments, the external device 345 includes the camera 315 that captures the image of the fastener or the packaging. The external device 345 can then provide the image of the fastener to the controller 300 and/or the machine learning controller 530.

At block 710, the controller 300, the external device 345, and/or the machine learning controller 530 identifies a type of the fastener based on the visual indication. For example, the controller 300, the external device 345, and/or the machine learning controller 530 may provide the visual indication of the fastener to the machine learning control 610. The machine learning control 610 implements a trained machine learning algorithm on the visual indication to identify the type of the fastener (for example, determine a size, thread count, and material of the fastener, determine characteristics of the fastener, and the like). The results of the trained machine learning algorithm is transmitted from the machine learning controller 530 to the controller 300.

At block 715, the controller 300, the external device 345, and/or the machine learning controller 530 determines a K-Factor of the fastener based on at least the fastener type or fastener characterization. For example, controller 300 and/or the machine learning controller 530 may compare the type and/or characterization of the fastener to a look-up table stored in the memory 355 and/or the machine learning memory 605. The controller 300 and/or the machine learning controller 530 determines a K-Factor value associated with the type of the fastener based on the comparison.

At block 720, the controller 300, external device 345, and/or the machine learning controller 530 sets or determines an operating parameter for driving the motor 105 based on the K-Factor. For example, the controller 300 and/or the machine learning controller 530 may compare the K-Factor value to a second look-up table stored in the memory 355 and/or the 605 to determine operating parameters values for driving the motor 105. In some embodiments, the operating parameter is a desired torque output or a maximum torque output of the motor 105. In such embodiments, the controller 300 may use torque signals from the torque sensor 325 to drive the motor 105 at the desired torque output. In other embodiments, the operating parameter may be an output torque of the motor 105, a voltage provided to the motor 105, a current provided to the motor 105, a speed of the motor 105, or a combination thereof. At block 725, the controller 300 drives the motor 105 according to the operating parameter.

Figure 8:
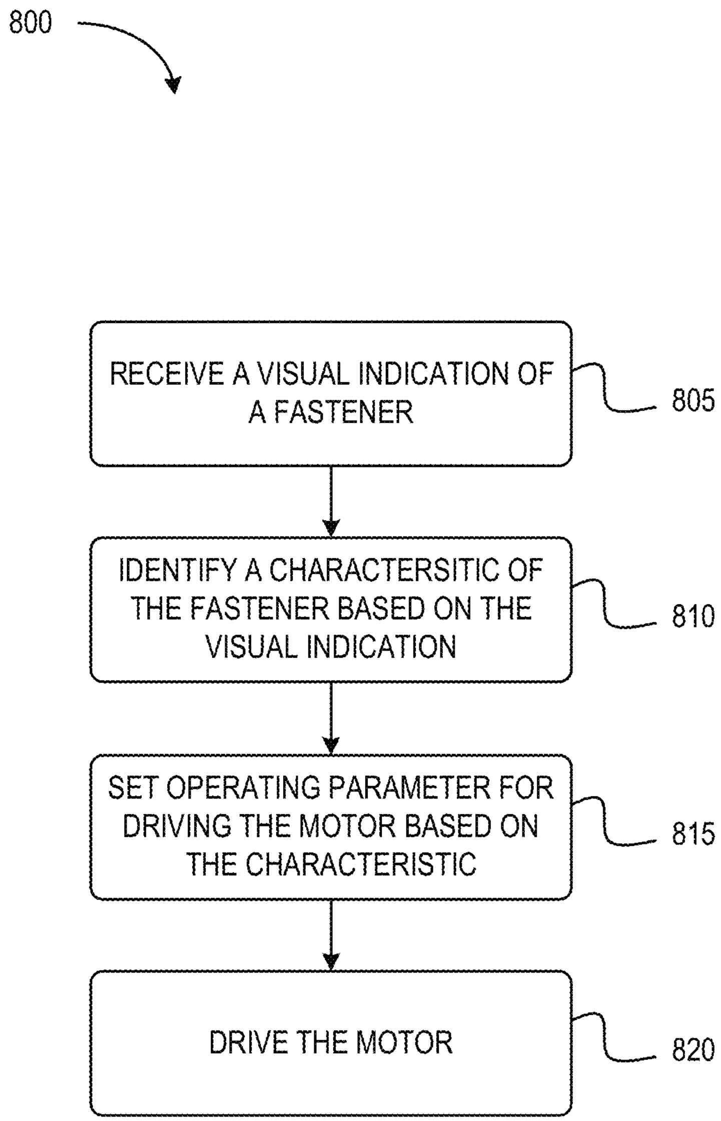
FIG. 8 is a block diagram of another method performed by the controller of FIG. 3 in accordance with embodiments described herein.

FIG. 8 provides a method 800 performed by the controller 300, the external device 345, and/or the machine learning controller 530 for controlling the motor 105 based on a characteristic of a fastener. At block 805, the controller 300, the external device 345, and/or the machine learning controller 530 receive a visual indication of a fastener. For example, the camera 315 provides the controller 300, the external device and/or the machine learning controller 530 with an image of a fastener. In some instances, the camera 315 provides an image of a packaging associated with a fastener (e.g., a box including size, manufacturer, SKU, etc.). In other embodiments, the external device 345 includes the camera 315 that captures the image of the fastener or the packaging, and the external device 345 provides the image of the fastener to the controller 300 and/or the machine learning controller 530.

At block 810, the controller 300 and/or the machine learning controller 530 identifies a characteristic of the fastener based on the visual indication. For example, the controller 300 and/or the machine learning controller 530 may provide the visual indication of the fastener to the machine learning control 610. The machine learning control 610 implements a trained machine learning algorithm on the visual indication to identify one or more characteristics of the fastener, such as a size of the fastener, a thread pitch of the fastener, a type of thread of the fastener, a length of the fastener, a material of the fastener, a coating applied to the fastener, a cleanliness of the fastener, a type of lubricant applied to the fastener, a reflectivity of the fastener, a temperature of the fastener, or a combination thereof.

At block 815, the controller 300 and/or the machine learning controller 530 sets an operating parameter for driving the motor 105 based on the characteristics of the fastener. For example, the controller 300 and/or the machine learning controller 530 may compare the determined characteristics to a second look-up table stored in the memory 355 and/or the 605 to determine operating parameters values for driving the motor 105. In some embodiments, the operating parameter is a desired torque output or a maximum torque output of the motor 105. In such embodiments, the controller 300 may use torque signals from the torque sensor 325 to drive the motor 105 at the desired torque output. In other embodiments, the operating parameter may be an output torque of the motor 105, a voltage provided to the motor 105, a current provided to the motor 105, a speed of the motor 105, or a combination thereof. At block 820, the controller 300 drives the motor 105 according to the operating parameter.

Representative Features

Representative features are set out in the following clauses, which stand alone or may be combined, in any combination, with one or more features disclosed in the text and/or drawings of the specification.

Clause 1. A power tool comprising: a motor; an impact mechanism coupled to the motor, the impact mechanism including: a hammer driven by the motor; and an anvil configured to receive an impact from the hammer and drive a fastener; and a controller connected to the motor, the controller configured to: receive a visual indication of the fastener, identify a type of the fastener based on the visual indication, determine a K-Factor of the fastener based on the type of the fastener, set an operating parameter for driving the motor based on the K-Factor, and drive the motor according to the operating parameter.

Clause 2. The power tool of clause 1, wherein the visual indication of the fastener includes an image of the fastener.

Clause 3. The power tool of any of the preceding clauses, wherein the visual indication of the fastener includes an image of a packaging for the fastener.

Clause 4. The power tool of any of the preceding clauses, wherein the type of the fastener is determined based on at least one of a size of the fastener, a thread pitch of the fastener, a type of thread of the fastener, a length of the fastener, a material of the fastener, a coating applied to the fastener, a cleanliness of the fastener, a type of lubricant applied to the fastener, a reflectivity of the fastener, or a temperature of the fastener.

Clause 5. The power tool of any of the preceding clauses, wherein, to identify the type of the fastener, the controller is configured to apply a machine-learning model to the visual indication of the fastener.

Clause 6. The power tool of clause 5, wherein, to identify the type of the fastener, the controller is configured to transmit the visual indication to a server, and the server is configured to store the machine-learning model.

Clause 7. The power tool of any of the preceding clauses, wherein the operating parameter is an output torque of the motor.

Clause 8. The power tool of any of the preceding clauses, wherein the power tool includes a camera configured to capture the visual indication of the fastener.

Clause 9. The power tool of any of the preceding clauses, wherein the power tool includes a transceiver configured to communicate with an external device, and wherein the controller is configured to receive the visual indication of the fastener from the external device.

Clause 10. A method for controlling a power tool motor, the method comprising: receiving a visual indication of a fastener, wherein the fastener is driven by the power tool motor; identifying a type of the fastener based on the visual indication; determining a K-Factor of the fastener based on the type of the fastener; setting an operating parameter for driving the power tool motor based on the K-Factor; and driving the power tool motor according to the operating parameter.

Clause 11. The method of clause 10, wherein the visual indication of the fastener includes an image of the fastener.

Clause 12. The method of any of clauses 10-11, wherein the visual indication of the fastener includes an image of a packaging for the fastener.

Clause 13. The method of any of clauses 10-12, wherein the type of the fastener is determined based on at least one of a size of the fastener, a thread pitch of the fastener, a type of thread of the fastener, a length of the fastener, a material of the fastener, a coating applied to the fastener, a cleanliness of the fastener, a type of lubricant applied to the fastener, a reflectivity of the fastener, or temperature of the fastener.

Clause 14. The method of any of clauses 10-13, wherein identifying the type of the fastener includes implementing a machine-learning model on the visual indication of the fastener.

Clause 15. The method of clause 14, wherein identifying the type of the fastener includes transmitting the visual indication to a server, and the server stores the machine-learning model. Clause 16. The method of any of clauses 10-15, wherein the operating parameter is an output torque of the power tool motor.

Clause 17. The method of any of clauses 10-16, wherein receiving the visual indication of the fastener includes receiving an image of the fastener from a camera embedded within a housing of the power tool.

Clause 18. A power tool comprising: a motor; and a controller connected to the motor, the controller configured to: receive a visual indication of a fastener, identify, using a machine-learning model, a characterization of the fastener based on the visual indication, determine a characteristic of the fastener based on the characterization of the fastener, set an operating parameter for driving the motor based on the characteristic of the fastener, and drive the motor according to the operating parameter.

Clause 19. The power tool of clause 18, wherein the power tool includes a camera configured to capture the visual indication of the fastener.

Clause 20. The power tool of any of clauses 18-19, wherein the power tool includes a transceiver configured to communicate with an external device, and wherein the controller is configured to receive the visual indication of the fastener from the external device.

Thus, embodiments described herein provide, among other things, techniques for determining tool parameters based on characteristics of a driven fastener. Various features and advantages are set forth in the following claims.

What is claimed is:

1. A power tool comprising:

a motor;

an impact mechanism coupled to the motor, the impact mechanism including:

a hammer driven by the motor; and an anvil configured to receive an impact from the hammer and drive a fastener; and a controller connected to the motor, the controller configured to:

receive a visual indication of the fastener, identify a type of the fastener based on the visual indication, determine a K-Factor of the fastener based on the type of the fastener, set an operating parameter for driving the motor based on the K-Factor, and drive the motor according to the operating parameter.

2. The power tool of claim 1, wherein the visual indication of the fastener includes an image of the fastener.

3. The power tool of claim 1, wherein the visual indication of the fastener includes an image of a packaging for the fastener.

4. The power tool of claim 1, wherein the type of the fastener is determined based on at least one of a size of the fastener, a thread pitch of the fastener, a type of thread of the fastener, a length of the fastener, a material of the fastener, a coating applied to the fastener, a cleanliness of the fastener, a type of lubricant applied to the fastener, a reflectivity of the fastener, or a temperature of the fastener.

5. The power tool of claim 1, wherein, to identify the type of the fastener, the controller is configured to apply a machine-learning model to the visual indication of the fastener.

6. The power tool of claim 5, wherein, to identify the type of the fastener, the controller is configured to transmit the visual indication to a server, and the server is configured to store the machine-learning model.

7. The power tool of claim 1, wherein the operating parameter is an output torque of the motor.

8. The power tool of claim 1, wherein the power tool includes a camera configured to capture the visual indication of the fastener.

9. The power tool of claim 1, wherein the power tool includes a transceiver configured to communicate with an external device, and wherein the controller is configured to receive the visual indication of the fastener from the external device.

10. A method for controlling a power tool motor, the method comprising:

receiving a visual indication of a fastener, wherein the fastener is driven by the power tool motor;

identifying a type of the fastener based on the visual indication;

determining a K-Factor of the fastener based on the type of the fastener;

setting an operating parameter for driving the power tool motor based on the K-Factor; and driving the power tool motor according to the operating parameter.

11. The method of claim 10, wherein the visual indication of the fastener includes an image of the fastener.

12. The method of claim 10, wherein the visual indication of the fastener includes an image of a packaging for the fastener.

13. The method of claim 10, wherein the type of the fastener is determined based on at least one of a size of the fastener, a thread pitch of the fastener, a type of thread of the fastener, a length of the fastener, a material of the fastener, a coating applied to the fastener, a cleanliness of the fastener, a type of lubricant applied to the fastener, a reflectivity of the fastener, or temperature of the fastener.

14. The method of claim 10, wherein identifying the type of the fastener includes implementing a machine-learning model on the visual indication of the fastener.

15. The method of claim 14, wherein identifying the type of the fastener includes transmitting the visual indication to a server, and the server stores the machine-learning model.

16. The method of claim 10, wherein the operating parameter is an output torque of the power tool motor.

17. The method of claim 10, wherein receiving the visual indication of the fastener includes receiving an image of the fastener from a camera embedded within a housing of the power tool.

18. A power tool comprising:

a motor; and a controller connected to the motor, the controller configured to:

receive a visual indication of a fastener, identify, using a machine-learning model, a characterization of the fastener based on the visual indication, determine a K-Factor of the fastener based on the characterization of the fastener, set an operating parameter for driving the motor based on the K-Factor of the fastener, and drive the motor according to the operating parameter.

19. The power tool of claim 18, wherein the power tool includes a camera configured to capture the visual indication of the fastener.

20. The power tool of claim 18, wherein the power tool includes a transceiver configured to communicate with an external device, and wherein the controller is configured to receive the visual indication of the fastener from the external device.

* * * * *